(12) United States Patent
Wabgaonkar et al.

(10) Patent No.: US 11,397,888 B2
(45) Date of Patent: Jul. 26, 2022

(54) VIRTUAL AGENT WITH A DIALOGUE MANAGEMENT SYSTEM AND METHOD OF TRAINING A DIALOGUE MANAGEMENT SYSTEM

(71) Applicant: Accenture Global Solutions Limited, Dublin (IE)

(72) Inventors: Harshawardhan Madhukar Wabgaonkar, Mumbai (IN); Shubhashis Sengupta, Bangalore (IN); Tulika Saha, Kolkata (IN)

(73) Assignee: Accenture Global Solutions Limited, Dublin (IE)

( * ) Notice: Subject to any disclaimer, the term of this patent is extended or adjusted under 35 U.S.C. 154(b) by 1024 days.

(21) Appl. No.: 16/008,337

(22) Filed: Jun. 14, 2018

(65) Prior Publication Data
US 2019/0385051 A1    Dec. 19, 2019

(51) Int. Cl.
*G06N 3/08*    (2006.01)
*G06F 16/2457*    (2019.01)
*G06F 40/40*    (2020.01)

(52) U.S. Cl.
CPC ......... *G06N 3/08* (2013.01); *G06F 16/24578* (2019.01); *G06F 40/40* (2020.01)

(58) Field of Classification Search
CPC . G06N 99/00; G06N 3/08; G06N 3/04; G06F 17/30707; G06K 9/6269
USPC .......................................................... 706/20
See application file for complete search history.

(56) References Cited

U.S. PATENT DOCUMENTS

| | | | |
|---|---|---|---|
| 9,342,846 B2 * | 5/2016 | Maddali | G06F 40/279 |
| 9,679,258 B2 | 6/2017 | Mnih et al. | |
| 9,812,151 B1 * | 11/2017 | Amini | G10L 15/26 |
| 10,387,463 B2 * | 8/2019 | Campbell | G10L 15/1822 |
| 10,498,898 B2 * | 12/2019 | Mazza | G06F 16/3329 |
| 10,558,757 B2 * | 2/2020 | Fan | G06F 40/30 |
| 10,635,707 B2 * | 4/2020 | Perez | G06F 16/907 |
| 10,638,197 B2 * | 4/2020 | Bist | H04N 21/8455 |

(Continued)

OTHER PUBLICATIONS

Extended European Search Report dated Nov. 8, 2019 for European Patent Application No. EP19179183.9.

(Continued)

*Primary Examiner* — Niker A Lamardo
(74) *Attorney, Agent, or Firm* — Plumsea Law Group, LLC

(57) ABSTRACT

A virtual agent with a dialogue management system and a method of training the dialogue management system is disclosed. The dialogue management system is trained using a deep reinforcement learning process. Training involves obtaining or simulating training dialogue data. During the training process, actions for the dialogue management system are selected using a Deep Q Network to process observations. The Deep Q Network is updated using a target function that includes a reward. The reward may be generated by considering one or more of the following metrics: task completion percentage, dialogue length, sentiment analysis of the user's response, emotional analysis of the user's state, explicit user feedback, and assessed quality of the action. The set of actions that the dialogue management system can take at any time may be limited by an action screener that predicts the subset of actions that the agent should consider for a given state of the system.

20 Claims, 11 Drawing Sheets

(56) References Cited

U.S. PATENT DOCUMENTS

| | | | | |
|---|---|---|---|---|
| 10,650,095 | B2* | 5/2020 | Gupta | G06K 9/66 |
| 10,762,161 | B2* | 9/2020 | Rao | G06F 16/9577 |
| 10,860,629 | B1* | 12/2020 | Gangadharaiah | H04L 51/02 |
| 11,070,879 | B2* | 7/2021 | Wu | H04N 21/8549 |
| 2017/0140269 | A1 | 5/2017 | Schaul et al. | |
| 2017/0278018 | A1 | 9/2017 | Mnih et al. | |
| 2018/0052825 | A1 | 2/2018 | Lipton et al. | |
| 2018/0226076 | A1* | 8/2018 | Kotti | G10L 15/02 |
| 2018/0232435 | A1* | 8/2018 | Papangelis | G06F 16/3329 |
| 2018/0233143 | A1* | 8/2018 | Papangelis | G06F 16/3329 |

OTHER PUBLICATIONS

Bing Liu et al.: "Attention-Based Recurrent Neural Network Models for Joint Intent Detection and Slot Filling", http://arxiv.org, Cornell University Library, 201 Olin Library Cornell University Ithaca, NY 14853, Sep. 6, 2016, XP080724506, DOI: 10.21437/Interspeech.2016-1352.

Liyun Wen et al.: "Jointly Modeling Intent Identification and Slot Filling with Contextual and Hierarchical Information" In: Huang X., Jiang J., Zhao D., Feng Y., Hong Y. (eds.): "Natural Language Processing and Chinese Computing. NLPCC 2017. Lecture Notes in Computer Science", Jan. 5, 2018, Springer, Cham, Cham, China, XP055637909, ISSN: 0302-9743 vol. 10619, pp. 3-15, DOI: 10.1007/978-3-319-73618-1_1.

Xiaodong Zhang et al.: "A Joint Model of Intent Determination and Slot Filling for Spoken Language Understanding", Proceedings of the Twenty-fifth International Joint Conference on Artificial Intelligence (IJCAI-16), Jul. 25, 2016, pp. 2993-2999, XP055637799, New York, USA; Retrieved from the Internet: url:https://pdfs semanticscholar.org/1f9e/2d6dfleaaf04aebf428d9fa9a9ffc89e373c.pdf [retrieved on Oct. 31, 2019].

Hado van Hasselt, "Learning to Predict Independent of Span", published on Oct. 18, 2018; arXiv: 1508.04582; (https://arxiv.org/pdf/1508.04582.pdf).

Hado van Hasselt et al., "Deep Reinforcement Learning With Double Q-learning", published on Dec. 8, 2015; arXiv: 1509.06461v3; (https://arxiv.org/pdf/1509.06461v3.pdf).

Long-ji Lin, "Self-Improving Reactive Agents Based on Reinforcement Learning, Planning and Teaching", published in May 1992, Machine Learning, vol. 8, Issue 3-4, pp. 293-321, Kluwer Academic Publishers (1992), Boston. (https://doi.org/10.1007/BF00992699).

Volodymyr Mnih et al., "Human-level control through deep reinforcement learning", published on Feb. 26, 2015; Nature, vol. 518, p. 529-533, Macmillan Publishers Limited (2015), (https://web.stanford.edu/class/psych209/Readings/MnihEtAlHassibis15NatureControlDeepRL.pdf).

Volodymr Mnih, "Machine Learning for Aerial Image Labeling", published 2013; thesis submitted in conformity with the requirement for the degree of Doctor of Philosophy; Graduate Department of Computer Science University of Toronto (2013).

Richard S. Sutton et al., "Reinforcement Learning : An Introduction", 2nd edition, in progress, A Bradford Book,The MIT Press.

Wang et al., "Dueling Network Architectures for Deep Reinforcement Learning", published Apr. 5, 2016; arXiv:1511.06581v3; (https://arxiv.org/pdf/1511.06581.pdf).

Hado van Hasselt, "Lecture 1: Introduction to Reinforcement Learning", (http://hadovanhasselt.worldpress.com/2016/01/12/ucl-course/).

* cited by examiner

VIRTUAL AGENT WITH A DIALOGUE MANAGEMENT SYSTEM AND METHOD OF TRAINING A DIALOGUE MANAGEMENT SYSTEM

CROSS-REFERENCE TO RELATED APPLICATION

This application is related to co-pending U.S. Pat. No. 10,679,613, filed on Jun. 14, 2018, and titled "Spoken Language Understanding System and Method Using Recurrent Neural Networks," which is hereby incorporated by reference in its entirety.

TECHNICAL FIELD

The present disclosure generally relates to virtual agents with a dialogue management system. More specifically, the present disclosure generally relates to a dialogue management system and method for training the dialogue management system.

BACKGROUND

Virtual agents are computer-generated agents that can interact with users. Goal- or task-oriented virtual agents may communicate with human users in a natural language and work with or help the users in performing various tasks. The tasks performed by a virtual agent can vary in type and complexity. Exemplary tasks include information retrieval, rule-based recommendations, as well as navigating and executing complex workflows. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers. However, traditionally, virtual agents may struggle to engage in natural conversation with customers, which may lead to reduced customer satisfaction. Additionally, conventional methods for developing and training the virtual agents may be tedious and time consuming.

There is a need in the art for a system and method that addresses the shortcomings discussed above.

SUMMARY

A dialogue management system for a virtual agent, and a method of training the dialogue management system is disclosed. The dialogue management system and method solve the problems discussed above by utilizing a reinforcement learning system to efficiently train the agent to respond to a wide range of user requests and responses. Using a deep reinforcement learning process, the dialogue management system and method improves the virtual agent's ability to interact with the user in a natural (i.e., human) conversational manner. The dialogue management system and method further improve the training efficiency of a virtual agent by using dynamically calculated rewards in the deep reinforcement learning process. By using a deep reinforcement learning process with dynamically calculated rewards, the dialogue management system can be trained without the use of labeled training data. In addition, the dialogue management system may use multiple kinds of reward components that are then used to calculate an overall reward. Using multiple reward components to determine an overall reward for a virtual agent may help the agent learn to balance competing goals. By incorporating a range of metrics that balance short-term and long-term satisfaction of a user, the agent may learn more accurate and robust strategies and may provide responses that are more conversational in manner compared to approaches that focus on narrowly defined metrics (i.e., only immediate user satisfaction or only end-of-dialog user feedback).

The dialogue management system and method further improve training of a virtual agent by using an action screener. Using an action screener can reduce computational resources (and/or computation time) by reducing the number of calculations that must be made on forward and backward passes through the neural network. These resource and time savings may be significant when the deep neural networks used are sufficiently large. In addition, using an action screener helps reduce the chances that the neural network will converge to a poor solution. Thus, by using an action screener, the quality of the virtual agent's actions and responses to the user may be improved.

In one aspect, the disclosure provides a method of training a dialogue management system to converse with an end user, the method including retrieving training dialogue data and generating a first observation from the training dialogue data. The method may include feeding the first observation into a neural network to generate a first set of predicted outputs, where the first set of predicted outputs includes a predicted value. The method may include selecting a first recommended action for the dialogue management system according to the first set of predicted outputs, using the first recommended action to generate a second observation from the training dialogue data and generating a reward using the second observation. The method may include calculating a target value, where the target value depends on the reward. The method may include using the target value and the predicted value to update parameters of the neural network and feeding the second observation into the neural network to generate a second recommended action.

In another aspect, the method may include identifying a current task, calculating a completion percentage of the current task, where the reward is calculated as a function of the completion percentage of the current task.

In another aspect, the method may include identifying one or more user feedback tokens in the first observation, where the reward is calculated as a function of the number of user feedback tokens.

In another aspect, the method may include performing a sentiment analysis on information derived from the first observation, where the reward is calculated as a function of the output of the sentiment analysis.

In another aspect, the method may include receiving image information corresponding to a real or simulated user and analyzing the image information to determine an emotional state of the real or simulate user. The reward is calculated as a function of the emotional state.

In another aspect, the method may include using an action screener to constrain the number of predicted outputs that need to be calculated by the neural network.

In another aspect, the step of using the action screener may further include feeding information related to the first observation into a classification module and outputting a classification score for each action in a set of actions. The method may further include retrieving a classification threshold and generating a subset of actions from the set of actions, where the subset of actions includes actions for which the classification score is greater than the classification threshold. The method may further include constraining the number of predicted outputs that need to be calculated by the neural network according to the subset of actions.

In another aspect, the classification scores output by the classification module are used to calculate the reward.

In another aspect, the method may further include steps of feeding the second observation into a second neural network to generate a second set of predicted outputs, where the predicted value from the second set of predicted outputs is used with the reward to calculate the target value.

In another aspect, the second neural network may be updated less frequently than the first neural network.

In another aspect, the disclosure provides a non-transitory computer-readable medium storing software comprising instructions executable by one or more computers which may, upon such execution, cause the one or more computers to: (1) retrieve training dialogue data; (2) generate a first observation from the training dialogue data; (3) feed the first observation into a neural network to generate a first set of predicted outputs, the first set of predicted outputs including a predicted value; (4) select a first recommended action for a dialogue management system according to the first set of predicted outputs; (5) use the first recommended action to generate a second observation from the training dialogue data; (6) generate a reward using the second observation; (7) calculate a target value, wherein the target value depends on the reward; (8) use the target value and the predicted value to update parameters of the neural network; and (9) feed the second observation into the neural network to generate a second recommended action.

In another aspect, the instructions executable by one or more computers, upon such execution, may cause the one or more computers to identify a current task, calculate a completion percentage of the current task and calculate the reward using the completion percentage of the current task.

In another aspect, the instructions executable by one or more computers, upon such execution, may cause the one or more computers to identify one or more user feedback tokens in the first observation and calculate the reward using the number of user feedback tokens.

In another aspect, the instructions executable by one or more computers, upon such execution, may cause the one or more computers to perform a sentiment analysis on information derived from the first observation and calculate the reward using the output of the sentiment analysis.

In another aspect, the instructions executable by one or more computers, upon such execution, may cause the one or more computers to use an action screener to constrain the number of predicted outputs that need to be calculated by the neural network.

In another aspect, the disclosure provides a dialogue management system and a reinforcement learning system for training the dialogue management system to converse with an end user, comprising one or more computers and one or more storage devices storing instructions that are operable, when executed by the one or more computers, to cause the one or more computers to: (1) retrieve training dialogue data; (2) generate a first observation from the training dialogue data; (3) feed the first observation into a neural network to generate a first set of predicted outputs, the first set of predicted outputs including a predicted value; (4) select a first recommended action for the dialogue management system according to the first set of predicted outputs; (5) use the first recommended action to generate a second observation from the training dialogue data; (6) generate a reward using the second observation; (7) calculate a target value, wherein the target value depends on the reward; (8) use the target value and the predicted value to update parameters of the neural network; and (9) feed the second observation into the neural network to generate a second recommended action.

In another aspect, the instructions are operable, when executed by the one or more computers, to cause the one or more computers to generate the reward using a sentiment analysis performed on the first observation.

In another aspect, the instructions are operable, when executed by the one or more computers, to cause the one or more computers to generate the reward using the number of user feedback tokens identified in the first observation.

In another aspect, the instructions are operable, when executed by the one or more computers, to cause the one or more computers to use an action screener to output a classification score for each action in a set of actions.

In another aspect, the instructions are operable, when executed by the one or more computers, to cause the one or more computers to use a classification score when generating the reward.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

A dialogue management system for use with a virtual agent, as well as a method for training the dialogue management system, are disclosed. The dialogue management system is trained using a deep reinforcement learning process. The deep reinforcement learning process may use a Deep Q Network (DQN), a Double Deep Q Network (DDQN), or other kinds of deep learning networks as described in further detail below. To train the dialogue management system, training dialogues comprising simulated conversations between the virtual agent and a customer are created. The training dialogues function as the "environment" for training the agent. The set of actions a virtual agent may take during the training process are constrained by an action screening process. Rewards for each action in the learning process are dynamically generated based on information related to the current state (e.g., percent of task completion, dialogue length, etc.).

Figure 1:
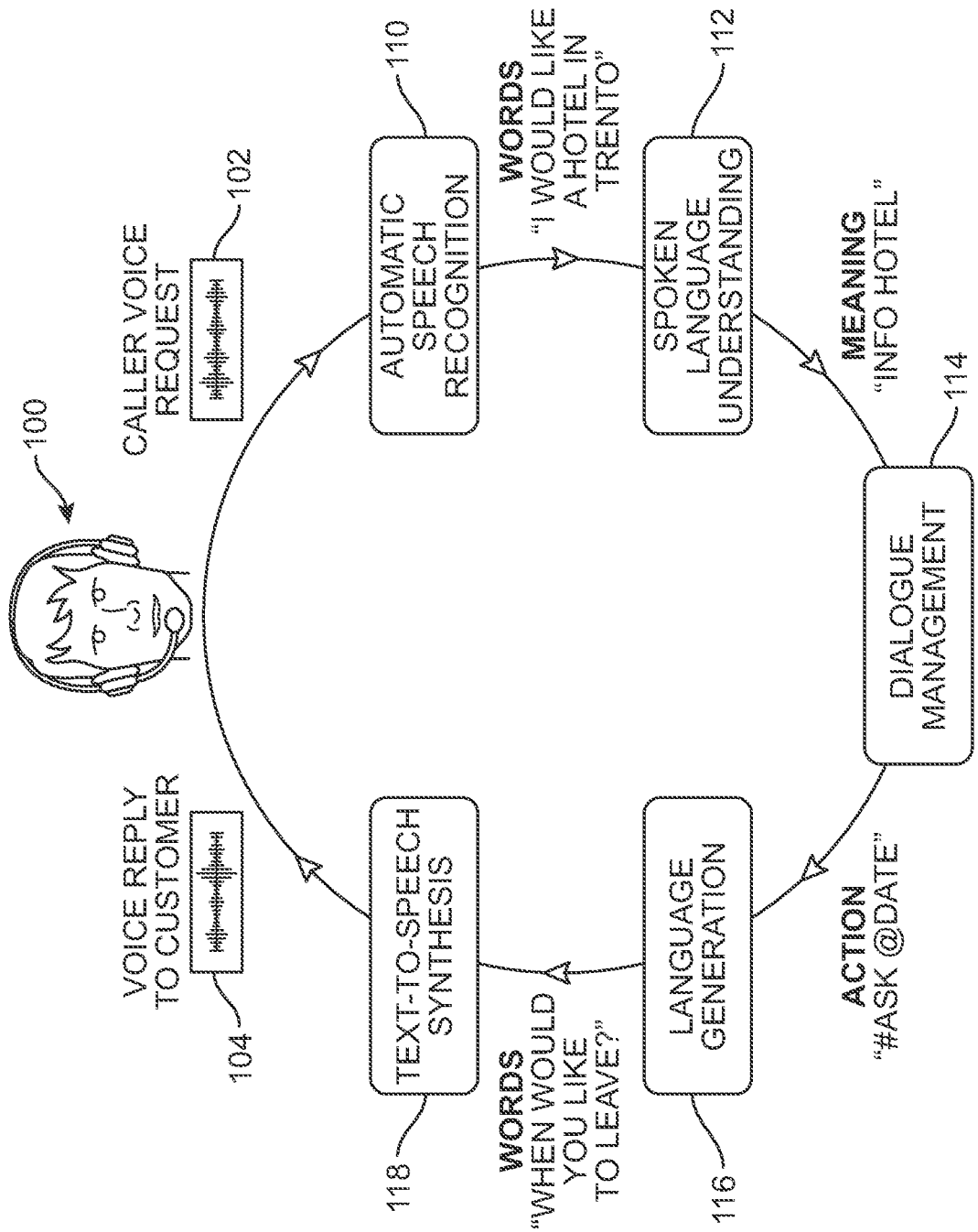
FIG. 1 is a schematic diagram of an embodiment of a virtual agent that corresponds with a customer.

The dialogue management system (also referred to as simply a "dialogue manager") comprises a subsystem of a virtual agent. The virtual agent takes in requests from a customer (or other end user) and processes the requests before responding back to the customer. To process requests from a customer and respond appropriately, the virtual agent may include multiple subsystems or modules that help solve various subtasks (e.g., voice recognition). For example, FIG. 1 shows an exemplary virtual agent 100 including a series of processes that occur between a request 102 (e.g., "caller voice request") and a response 104 (e.g., "voice reply to customer"). While the exemplary embodiment depicts a conversation that occurs as a phone call between virtual agent 100 and a customer, in other embodiments a virtual agent could communicate with a customer through other means including text-based communication (e.g., SMS or a chat-based application) and/or video communication (e.g., using Skype or Facetime).

Following the exemplary process characterized in FIG. 1, request 102 is first processed by an automatic speech recognition system 110. The goal of speech recognition system 110 is to convert spoken words into a string, or sequence, of words that can be used by systems downstream of speech recognition system 110. For example, speech recognition system 110 may convert a received audio signal (the customer's request over the phone) into the string, or sequence, of words "I would like a hotel in Trento." This sequence of words is then passed to a spoken language understanding system 112.

The goal of spoken language understanding system 112 is to extract the meaning of the string of words passed on from speech recognition system 110. For example, spoken language understanding system 112 may analyze the phrase "I would like a hotel in Trento" and determine that the customer is looking for information about a hotel. More specifically, in some embodiments, the spoken language understanding system takes in a word sequence as input and outputs (1) the general category (e.g., question, command, or information) of the word sequence, (2) the intent of the user, and (3) slot names and values. The intent corresponds to the topic of the word sequence (e.g., "flights", "hotels", "restaurants," etc.). Slots correspond to goal-relevant pieces of information. The slot name refers to a type or category of information that may be domain specific, such as "location" or "check-in date" in the context of booking a hotel. The slot values correspond to the particular choice for the slot name, such as "Trento" for the slot name "location."

The outputs of spoken language understanding system 112, which provide the extracted meaning of a word sequence, may be passed to dialogue management system 114. In the example shown in FIG. 1, the extracted information "info hotel" is provided to dialogue management system 114. However, it may be appreciated that in some cases the passed information could include the category, intent, and list of slot names/values corresponding to the original word sequence.

The goal of dialogue management system 114 is to track the current state of the dialogue between virtual agent 100 and the customer and to respond to the request in a conversational manner. Dialogue management system 114 generates an action based on the information received from spoken language understanding system 112, as well as the state of the dialogue with the customer.

The action immediately output by dialogue management system 114 may be symbolic in nature (e.g., "#ask @date"). This symbolic output is then converted into a natural language response by a language generation system 116. For example, language generation system 116 may receive input from dialogue management system 114 (e.g., "#ask @date") and output a string of words (e.g., "when would you like to leave?"). These words may then be converted into an audible response 104 by text-to-speech synthesis unit 118. It may be appreciated that this cycle represented by FIG. 1 may be repeated after each customer request (or other utterance) such that virtual agent 100 provides a response and continues a conversation with the customer until the customer goals have been met.

Figure 2:
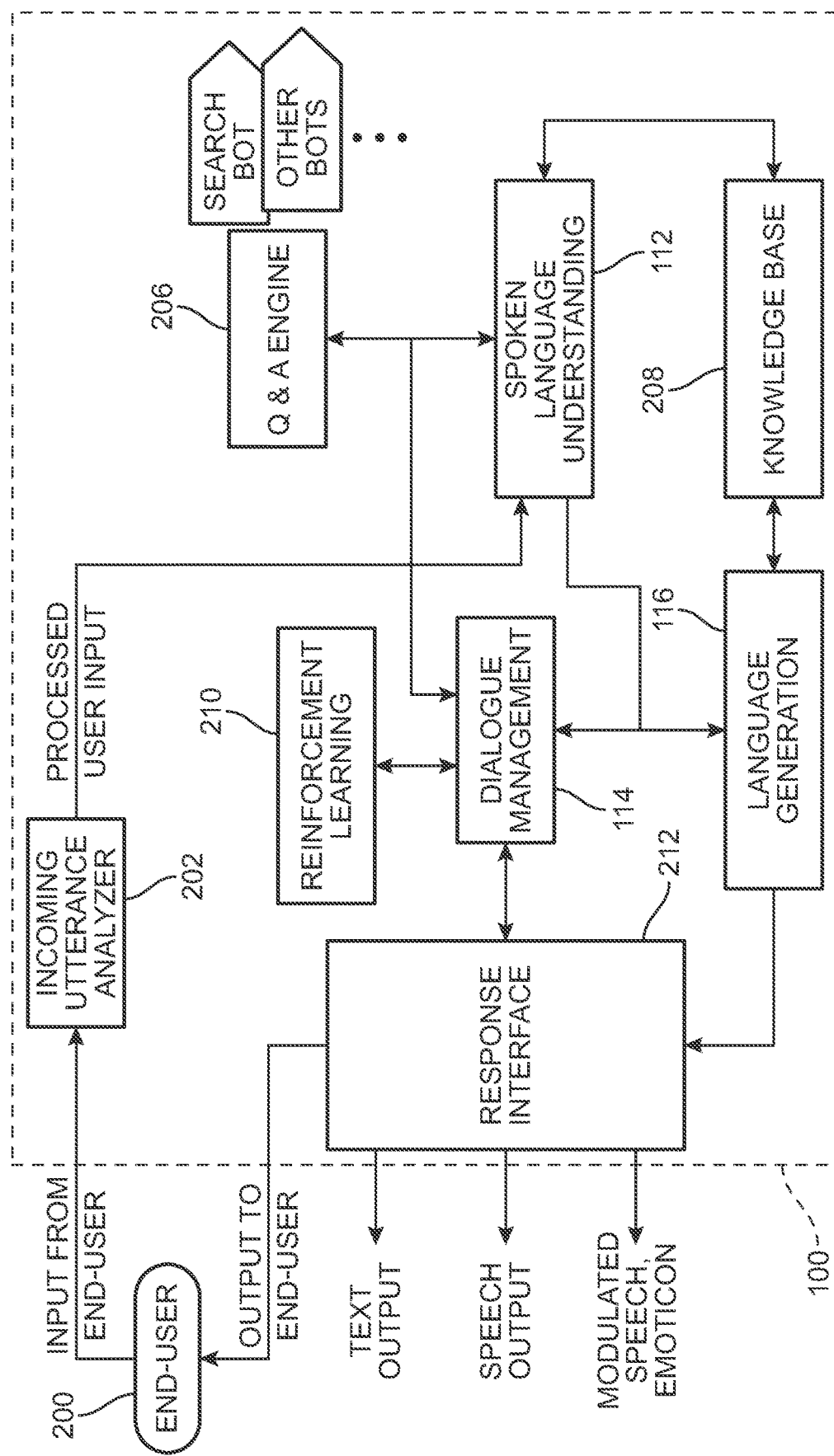
FIG. 2 is a schematic diagram of an embodiment of a virtual agent architecture.

A virtual agent may include additional subsystems and modules to achieve the goal of conversing with a customer and achieving the customer goals. For example, FIG. 2 is a schematic view of an embodiment of an architecture for virtual agent 100. Referring to FIG. 2, an end user 200 communicates with virtual agent 100. Communication may occur through various modes, including text-based chat programs that may run on a desktop, laptop or mobile device, telephone calls, audio and/or video calls transmitted over the internet (e.g., through services such as Skype) as well as other known modes of communication.

Input from end user 200 may be received and processed by an incoming utterance analyzer 202. In some cases, incoming utterance analyzer 202 may identify the type of input (e.g., audio, text, gestures, etc.) and direct the input to the proper sub-module (such as an automatic speech recognition module for audio input or a gesture interpreter for gesture-based inputs). The processed user input, which may take the form of strings of words, can then be passed to spoken language understanding system 112 to extract meaning from the end-user input.

Spoken language understanding system 112 may further communicate with dialogue management system 114. In some cases, spoken language understanding system 112 may also directly communicate with language generation system 116. Language generation system 116 can include modules to facilitate converting symbolic (or otherwise coded) output into a natural language format. Such modules could include a randomized machine utterance generator and a narrative generator. In some cases, natural language utterances may be generated using a Sequence Generative Adversarial Net (seqGAN).

A virtual agent can include provisions for gathering information. For example, in FIG. 2, spoken language understanding system 112 and/or dialogue management system 114 may communicate with a Q&A ("Question & Answer") Engine 206. Q&A Engine 206 can include submodules for identifying a question and determining if the question has been previously stored (or indexed) or if it is a new question. Q&A Engine 206 can also include provisions for searching for information on the web or in other systems accessible by virtual agent 100. For example, to look up the answer to a particular question, Q&A Engine 206 may use a search bot and/or other kinds of bots. In some cases, Q&A Engine 206 may access external services through an application protocol interface (API).

A virtual agent can include provisions for storing various kinds of information. For example, virtual agent 100 can include a knowledge base system 208. Knowledge base system 208 could include databases for storing a training collection, user and state info, and various kinds of domain specific knowledge (e.g., in the form of a graph).

A virtual agent can include provisions for learning to converse with an end user in a natural manner. For example, virtual agent 100 may include a reinforcement learning module 210. In the example of FIG. 2, dialogue management system 114, which may be trained using reinforcement learning processes as described above, can communicate directly with reinforcement learning module 210. In some cases, reinforcement learning module 210 may only be accessed during training sessions. In other cases, reinforcement learning module 210 may be accessed while virtual agent 100 is engaged with an end user, including a real customer. It may be appreciated that in some cases, other systems of virtual agent 100 could also communicate with, and utilize the resources of, reinforcement learning module 210.

Output to a user is provided at a response interface system 212. Response interface system 212 may communicate with dialogue management system 114 and/or language generation system 116. Information received from either of these units can be converted into a final output intended for end user 200. Response interface system 212 may therefore be capable of converting inputs from other systems into text, speech, and/or other kinds of expressions (such as modulated speech, emoticons, etc.).

A virtual agent and associated systems for communicating with a virtual agent may include one or more user devices, such as a computer, a server, a database, and a network. For example, a virtual agent running on a server could communicate with a user over a network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN. In embodiments where a user talks to a virtual agent using a phone (e.g., a landline or a cell phone), the communication may pass through a telecom network and/or a wide area network.

Figure 11:
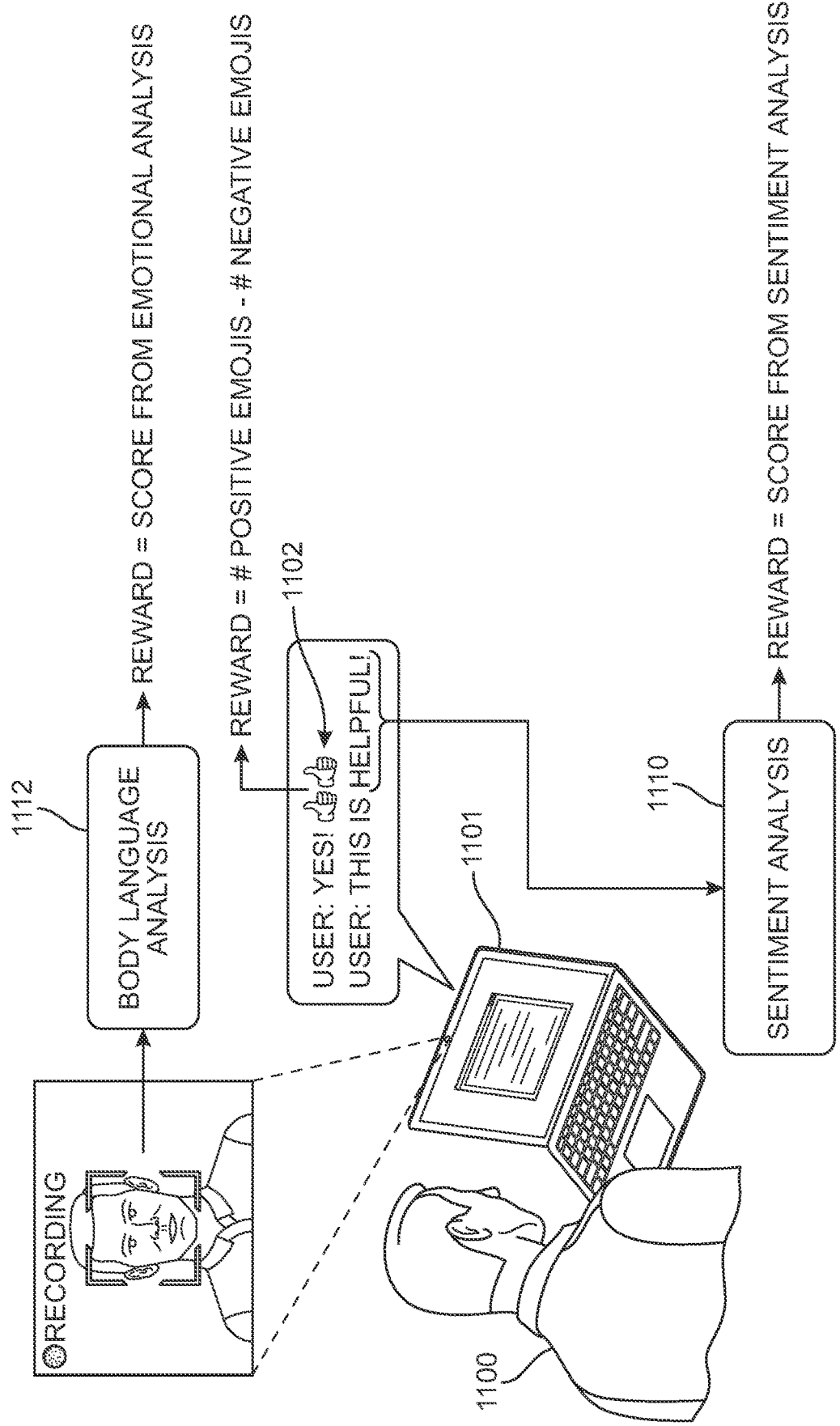
FIG. 11 is a schematic diagram of an embodiment of various methods for calculating reward components based on user responses and/or user body language.

The user device may be a computing device used by a user for communicating with a virtual agent. A computing device could be may a tablet computer, a smartphone, a laptop computer, a desktop computer, or another type of computing device. The user device may include a display that provides an interface for the user to input and/or view information. For example, as depicted in FIG. 11, a user could interact with a virtual agent using a program run on a laptop computer 1101, such as a text-based chat program, a voice-based communication program, and/or a video-based communication program. Alternatively, in some cases, the user device could be a telephone (e.g., a landline, cell phone, etc.).

One or more resources of a virtual agent may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

Figure 3:
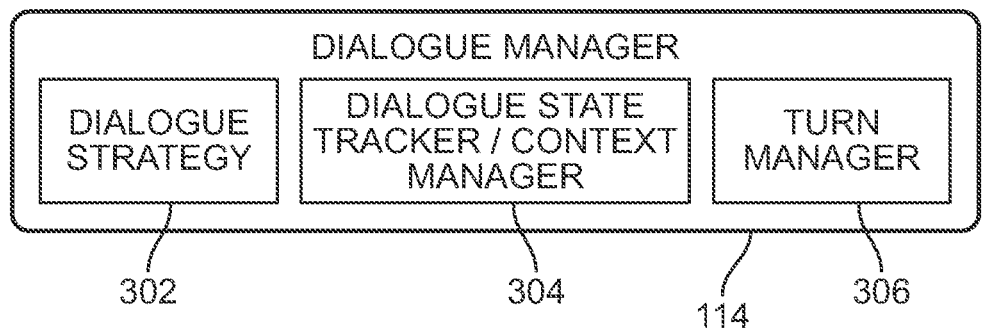
FIG. 3 is a schematic diagram of an embodiment of a dialogue manager.

A dialogue management system may include one or more subsystems or modules that help facilitate its goal of interacting with the user in a conversational manner. For example, FIG. 3 is a schematic view of an embodiment of several subsystems for dialogue management system 114. These include a dialogue strategy system 302, a dialogue state tracker and context manager 304, and a turn manager 306. Dialogue strategy system 302 may include systems and processes for determining how to proceed in a conversation given a recent user response, dialogue history, and/or other related information.

The dialogue state tracker and context manager 304 may keep track of the current system state, including properties of the virtual agent and the user. Additionally, the dialogue state tracker and context manager 304 may manage the dialogue context. As used here, the term "dialogue context" refers to information about the present dialogue with a user, including the history of statements between the user and agent. As each action is taken, the dialogue state tracker and context manager 304 may update the state including, possibly, the current dialogue context.

The turn manager 306 may be used to determine whether the virtual agent or user is expected to take an action at the present time.

The following systems and processes described as being part of dialogue management system 114 could be associated with dialogue strategy system 302, dialogue state tracker and context manager 304, and/or turn manager 306.

In order to develop a virtual agent that can interact in a conversational manner with an end user, a reinforcement learning approach is utilized. Specifically, the dialogue management system of the virtual agent uses deep reinforcement learning (DRL) to learn how to respond appropriately to user requests in a manner that is natural (i.e., human-like) and that meets the user's goals (e.g., booking a flight).

Figure 4:
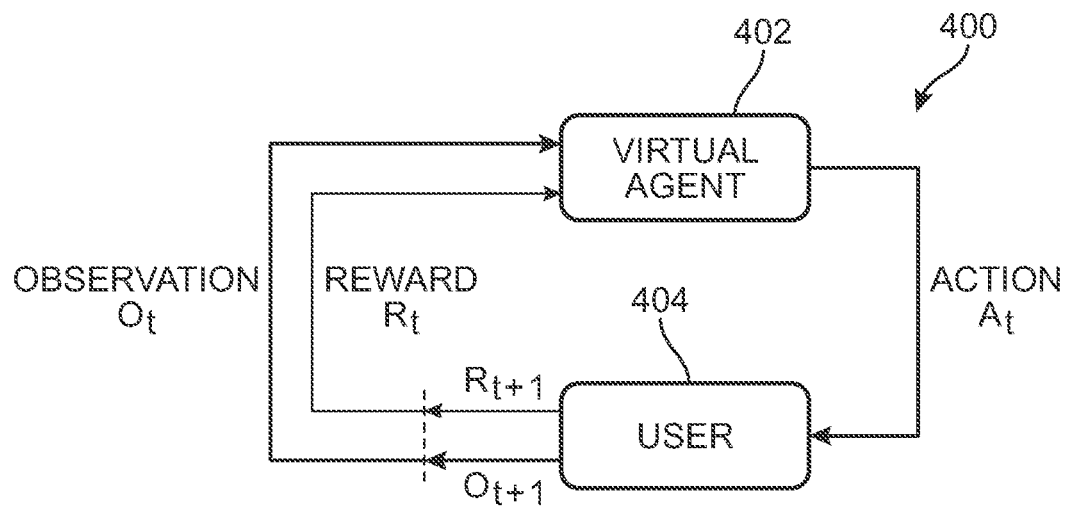
FIG. 4 is a schematic diagram of an embodiment of a reinforcement learning process.

FIG. 4 is a schematic overview of a reinforcement learning system 400 for a dialogue management system. In a reinforcement learning system, a virtual agent 402 interacts with an external system or environment of some kind. In the context of dialoguing with an end user, user 404 may comprise the interacting environment. It may be appreciated that the term "user" in this context may broadly refer to any collection of information representative of a user of the system. This may include samples of user responses collected from transcribed dialogues and/or samples collected from of simulated dialogues. Moreover, in some cases the user/environment may include additional information such as image data of the user's face and/or gesture data. This data could be real data collected from a human user or simulated data generated by a simulator.

The reinforcement learning system depicted in FIG. 4 is characterized by a repeating process: virtual agent 402 makes (or receives) an observation $O_t$ at time t of some aspect of the state of the system (i.e., of the user/environment). In some cases, the observation may be information related to the user's most recent response. In other cases, the observation could be part of, or the full, dialogue context. In still other cases, the observation could include other information gathered about the user, for example information from a video feed of the user that may capture nonverbal responses or gestures in addition to any verbal response. In addition to making an observation, virtual agent 402 may receive a reward $R_t$. In some cases, this reward could be explicitly provided by user 404 and/or the environment. In other cases, this reward could be determined by virtual agent 402 according to information from observation $O_t$, the dialogue context and/or any other information available to virtual agent 402 as it pertains to the state of the user/external system.

In response to making observation $O_t$, virtual agent 402 takes an action $A_t$ at time t. The user responds to this action which generates a new observation $O_{t+1}$ at time t+1. An explicit or implicit reward $R_{t+1}$ may also be explicitly provided by the user or determined by virtual agent 402 using information about the user/external system. This process is repeated until learning is stopped. Details regarding how and when learning is stopped are discussed below with respect to the process shown in FIG. 7. The virtual agent 402 learns which action A to take in response to an observation O by using the reward R as feedback to evaluate previous actions.

The learning characterized above is controlled by a particular reinforcement learning process. Some embodiments may employ a Q-Learning process, in which an agent tries to learn a function Q(s, a) that represents the "quality" of taking an action $A_t$=a in a state $S_t$=s. Thus, if an agent learns the correct Q function, they can choose an appropriate action in a state S by selecting the action A that yields the highest Q value for the current state. In the context of a dialogue management system, the state S is characterized by the virtual agent's observation O of the user's response and/or information such as the full dialogue context.

Figure 5:
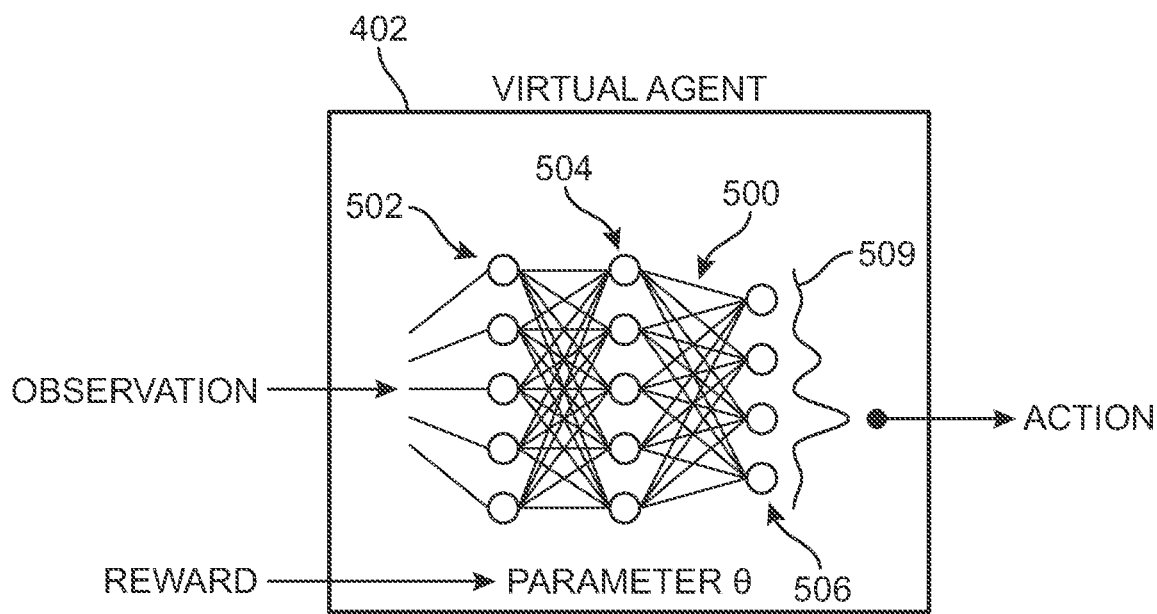
FIG. 5 is a schematic diagram of an embodiment of a virtual agent comprising a Deep Q Network process for learning.

FIG. 5 is a schematic view of an embodiment of virtual agent 402 that is trained using a Deep Q Network (DQN) process. A Deep Q Network (DQN) is a Q-Learning system that uses one or more deep neural networks (DNNs) to learn the desired Q function for a given reinforcement learning task. For example, in FIG. 5, virtual agent 402 includes a deep neural network 500 (or simply, DNN 500). An input layer 502 of DNN 500 corresponds to the current observation (e.g., $O_t$ of FIG. 4) of the system. Depending on the depth of the network, DNN 500 can include one or more intermediate or hidden layers (e.g., hidden layer 504). The nodes of output layer 506 each correspond to a particular Q value. Specifically, each node in the output layer 506 corresponds to a possible action ($A_1$, $A_2$, etc.) that may be taken in response to the current observation. That is, the values of the nodes in the output layer 506 correspond to the result of evaluating the Q-function (represented in FIG. 5 as function 509) in the context of a given observation O, for each possible action: Q(O, $A_1$), Q(O, $A_2$), etc. From the set of output Q values, the virtual agent selects the action corresponding to the largest Q value (i.e., the action associated with the node where function 509 is the largest). This action is then performed by the agent, and the reinforcement learning cycle shown in FIG. 4 is repeated.

DNN 500 includes parameters (or weights) θ. During the learning process, the values of these parameters may be updated. As indicated schematically in FIG. 5, the values of these parameters depend on the rewards received during the training process. The specific relationship between the network parameters and the rewards is discussed in further detail below with respect to FIG. 6.

Although the description refers to training virtual agent 402, it may be appreciated that the learning processes described in this description may primarily occur within the dialogue management system, as it is the dialogue management system that ultimately makes decisions about what actions a virtual agent will take in response to cues from the user/environment.

Figure 6:
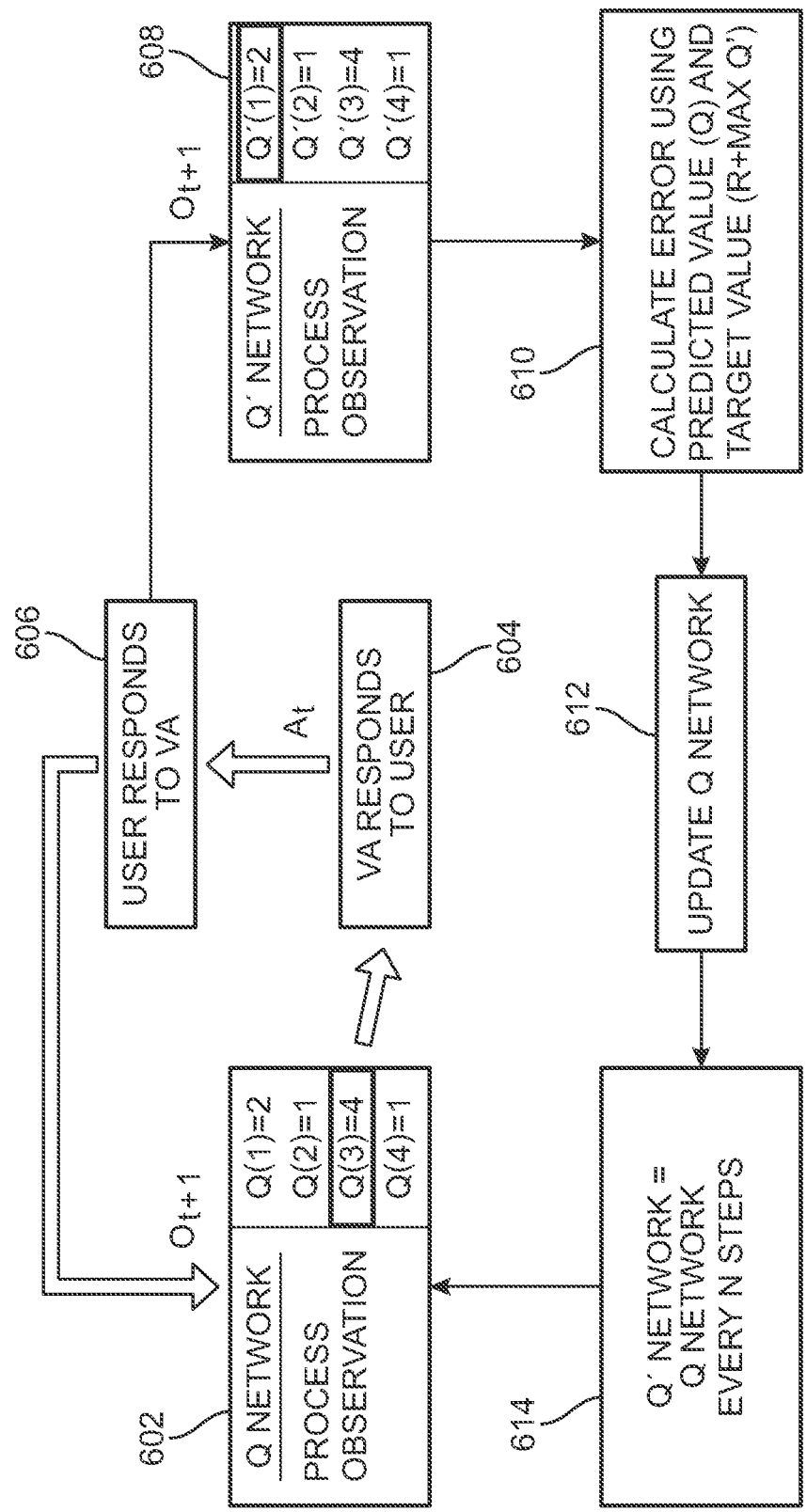
FIG. 6 is a schematic diagram of an embodiment of a Deep Q Network process for learning in the context of dialogue management.

FIG. 6 is a schematic view of some of the steps of the DQN training process. For clarity, some steps are not depicted here. Moreover, some of the steps have been greatly simplified.

The training process starts with the system in a known state. In the context of a dialogue management system, the state may be characterized by an observation of a user response in response to a known virtual agent action (such as a greeting). Alternatively, in some cases, the state could be characterized by a partial or full history of the dialogue. To obtain both the initial and subsequent user responses to future virtual agent actions, the dialogue management system may sample one or more training dialogues that comprise transcripts or simulations of conversations between a virtual agent and an end user.

The exemplary process of FIG. 6 may begin at a step 602, where a first DNN, referred to as the "Q Network," may process an observation (e.g., an observation $O_t$, which is not shown). Here, "processing" the observation means feeding the observation (e.g., a user response) into the Q Network and making a forward pass through the network to output a set of Q values. The action associated with the largest Q value is selected, and the agent performs this action $A_t$ at a step 604. In turn, the user responds to the virtual agent in a step 606, which changes the state of the user/environment and generates a new observation $O_{t+1}$. As discussed, the user response may be determined by a set of training dialogues. After the user has responded, the system may also generate a reward $R_{t+1}$ to be used later in later steps.

To facilitate learning, the Q Network needs to be updated before the agent takes an action in response to the new observation $O_{t+1}$. To update the Q Network, the error between the outputs of the Q Network and their expected values must be calculated. In the DQN system, the expected values are determined by a target function. The target function ($F_{TARGET}$) is a function of the reward R (if any) received after taking the last action and of the Q function evaluated on the new observation. Formally, $F_{TARGET}=R_t+\gamma \max_a Q(O_t, a)$. Here, γ is a learning "discount" factor, and the "max" operator is equivalent to calculating the value of Q for all possible actions and selecting the maximum value. The error is then calculated as the mean-squared-error between Q and $F_{TARGET}$. In practice, the DQN system uses a second "target" network, denoted Q', to calculate $F_{TARGET}$. Q' may be identical to Q, but may have different weights at some time steps in the training process. Using a separate target network, Q' has been shown to improve learning in many contexts.

Therefore, to update the Q Network, a second (or target) DNN (denoted the "Q' Network" in FIG. 6) is used to process the new observation and output a set of values Q'($O_t$, $A_1$), Q'($O_t$, $A_2$), etc., during a step 608. The maximum of these values is used, along with the reward R generated earlier, to calculate the target function. Then, the error for the Q Network is determined as a function of its outputs (Q values) and the target function in a step 610. In a step 612, the Q Network is updated via backpropagation using the error computed in step 610.

The Q' Network is not updated during each training pass. Instead, every N steps, where N is a meta-parameter of the training process, parameters θ' of the Q' Network are set equal to the latest values of the parameters θ of the Q Network. That is, every N steps, the Q' Network is simply replaced with a copy of the Q Network during a step 614.

Some embodiments may employ other techniques that can facilitate learning with DQNs. These can include the use of epsilon-greedy strategies and experience replay as well as other known techniques.

In some embodiments, a double deep Q learning (DDQN) system may be used. The DDQN system may be similar to the DQN system with some differences. In DDQN, the first DNN (e.g., the Q Network shown in FIG. 6) may be used to determine the best action at each training step, while the second DNN (e.g., the Q' Network) may be used to determine the associated Q value for taking that action. In some cases, using DDQN may help reduce overestimation of Q values that can occur with a DQN process.

Other embodiments could employ still further variations in the DQN architecture. For example, in another embodiment, a dueling DQN architecture could be employed.

It may be appreciated that the reinforcement learning process may be used in some contexts, but not others. For example, in one embodiment, the reinforcement learning process described above may be used while the dialogue management system is trained, but the process may not be used when the dialogue management system is tested (and/or deployed for use with real end users). Thus, in the training phase, the system may generally operate according to the process depicted in FIG. 6. However, during the testing and/or deployment phases, only the processes indicated in step 602, step 604, and step 606 may be used (as indicated by the fatter arrows in FIG. 6), while the other steps (i.e., step 608, step 610, step 612, and step 614) are not used (as indicated by the thinner arrows in FIG. 6). In terms of the Q Network, during training, both forward and backward passes are made through the network. During testing/deployment, however, only forward passes are made to generate recommended actions.

Figure 7:
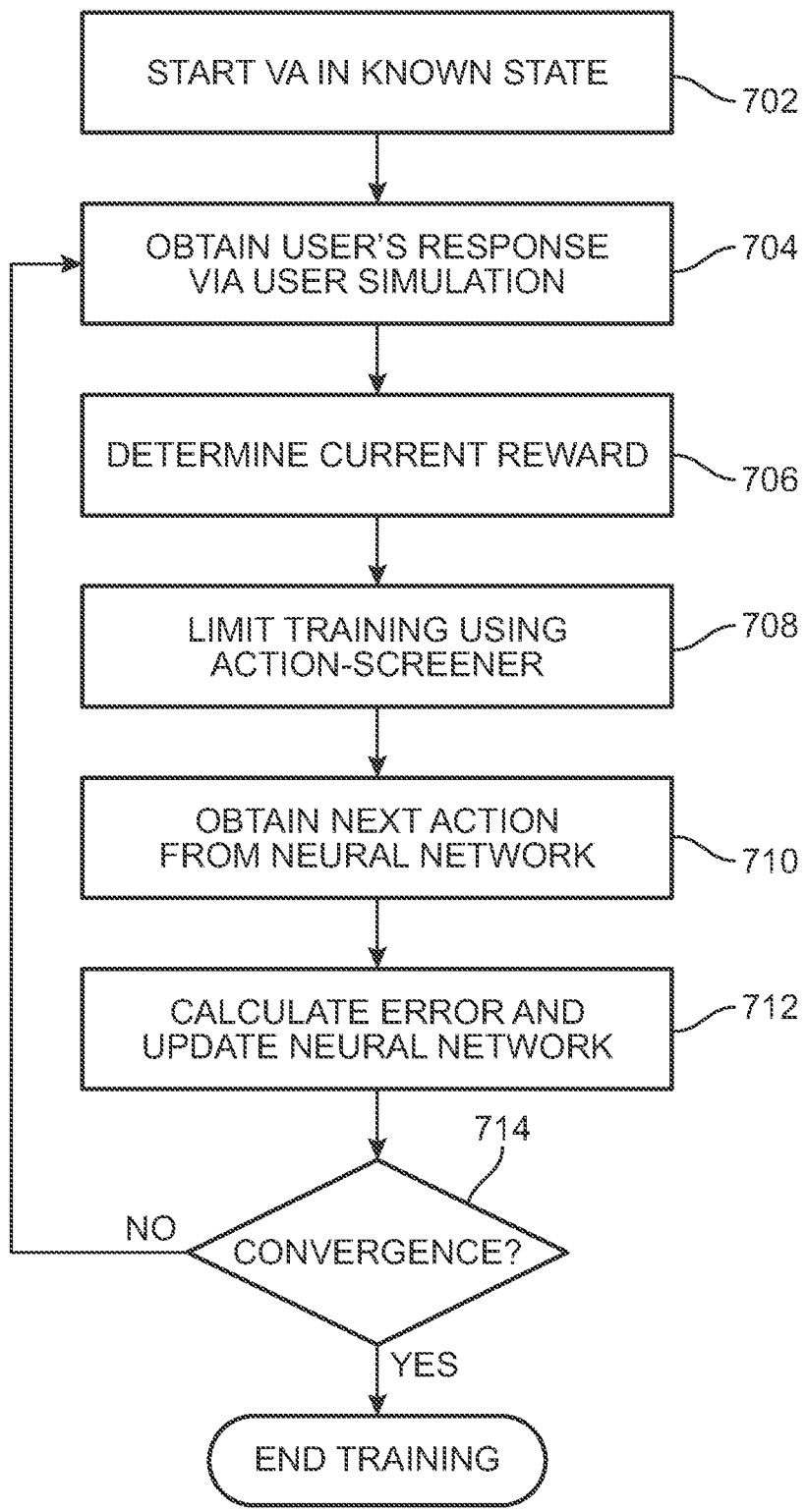
FIG. 7 is a schematic diagram of an embodiment of the process used to train a dialogue management system in a virtual agent.

FIG. 7 is a schematic overview of an exemplary process used to train the dialogue management system of a virtual agent. In a step 702, the virtual agent is started in a known state. For example, the process may start with the virtual agent greeting a user. Next, in a step 704, a user's response to the virtual agent's action may be obtained from a user simulation. In some cases, user responses may be generated in real time from a user simulation. In other cases, a collection of training dialogues may be generated a priori with a user simulation. In such cases, the observation may correspond with the virtual agent extracting the user's response by sampling the existing collection of training data.

Although the most recent user response may be used as the observation in some cases, in other cases, the observation may comprise a partial or full history of the training dialogue to some point (i.e., the full dialogue context) as well as possibly other meta-information related to the training dialogue. For example, in some cases, the observation may include information about the last few turns in the conversation, including several of the user's most recent responses.

Upon receiving the user's response, a reward is generated at a step 706. The reward is calculated using one or more metrics that are evaluated on the user response, the dialogue context and/or other information about the state of the user/environment.

In a step 708, the set of actions to be considered by the virtual agent are limited using an action screener. The action screener considers information related to the current dialogue context and recommends a subset of actions, from the set of all possible actions, for the dialogue management system to consider. Using an action screener can reduce computational resources (and/or computation time) by reducing the number of calculations that must be made on forward and backward passes through the neural network. These resource and time savings may be significant when the deep neural networks used are sufficiently large. In addition, using an action screener helps reduce the chances that the neural network will converge to a poor solution. Thus, by using an action screener, the quality of the virtual agent's actions and responses to the user may be improved.

In a step 710, the observation of the user's response is used to determine a next action. This is achieved by feeding the observation into the neural network and considering the set of output values. The action corresponding with the largest value (that is, the action corresponding to the node that has the greatest value after a forward pass through the network) is selected to be the next action taken by the virtual agent.

In a step 712, the error used for updating the neural network is calculated. As discussed above, when a Deep Q Learning process is used, the error is computed as a function of both the predicted value and a target value. The predicted value comes from the output of the neural network obtained in the previous step 710. The target value is calculated as function ($F_{TARGET}$) of the reward found during step 706 and from the output of a target network as discussed above with reference to FIG. 6. In some cases, the target network is a separate network with different parameters from the online network that is used to generate actions taken by the dialogue management system. The error is used to update the neural network by performing a backward pass through the network.

As indicated at a step 714, this process may continue until the system converges on a set of parameters for the neural network that result in a sufficiently small error on the training data.

It may be appreciated that the above steps could be performed in different orders in some other embodiments. As discussed in further detail below, in some embodiments, the reward may be generated using information provided by the action screener. In such an embodiment, the step 706 of determining the current reward may occur after the step 708 of applying the action screener.

Figure 8:
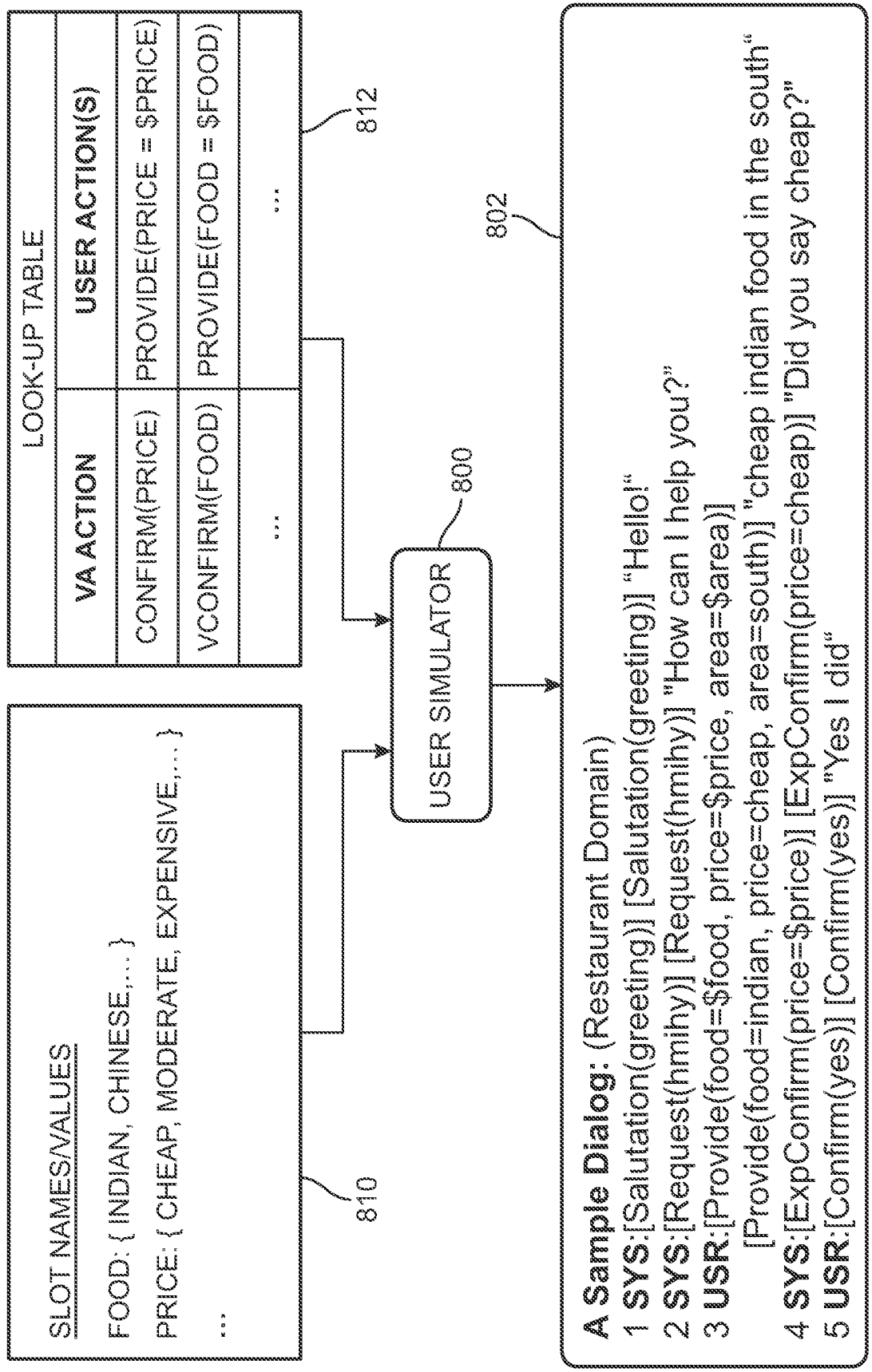
FIG. 8 is a schematic diagram of an embodiment of a user simulator that processes inputs and generates simulated dialogues between a user and a virtual agent.

FIG. 8 is a schematic view of an embodiment of a user simulator 800 as well as possible inputs and outputs (i.e., a simulated dialogue). It may be appreciated that user simulator 800 may represent one or more systems or processes used to generate simulated dialogues 802 from various kinds of inputs. These simulated dialogues may be sampled to obtain a user's response to a virtual agent's actions, as in step 704 of FIG. 7.

To generate a collection of training dialogues, or training dialogue data, user simulator 800 takes as input a set of domain information 810 and a look-up table 812. Set of domain information 810 may correspond with a set of domain-based or task-based information that may be the subject of a simulated user-agent interaction. In this simulated interaction, the agent is attempting to perform a task in a given domain through conversation with a user. As an example, FIG. 8 depicts several information slots such "food" and "price." Set of domain information 810 also includes, in this example, a list of possible "values" for these slots. For example, the value of food could be "Indian", "Chinese", etc. The value of price could be "Cheap", "Moderate", "Expensive", etc.

Look-up table 812 provides a set of potential user actions corresponding to a given action by the virtual agent. Thus, a "row" of the look-up table corresponds to pair: (virtual agent action, user action(s)). Depending on the virtual agent action, there may be multiple possible user actions. When multiple user actions are available, the system may use probabilistic sampling to select one as the user's response.

The actions listed in look-up table 812 are typically described in a shorthand or codified language. For example, a sample row from a diagnosis domain may appear as follows:

"Request(screen_color): Provide(screen_color=$screen_color)"

Here, "Request(screen_color)" is the virtual agent action in which the virtual agent asks for the color of the computer's screen. The corresponding user action is "Provide (screen_color=$screen_color)," which implies that the user provides the value of the computer's screen color to the virtual agent. In this user action, "screen_color" is the name of the slot, which is filled with the value "$screen_color". In this example, "$screen_color" is a placeholder for the slot value, which is filled in with a particular value (e.g., blue) when a simulated dialogue is generated.

In some embodiments, look-up table 812 could be replaced by a more elaborate device such as an associative memory device that can store and recall mappings similar to the above mapping.

The following description provides an exemplary process for generating simulated user data from set of domain information 810 and look-up table 812, which may be applicable to a wide variety domains or tasks.

To create the training data, a predetermined number of dialogues are simulated. An alternative is to simulate a plurality of dialogues until certain criteria are met. For example, a criterion could be that each nuance or aspect of the domain-task is covered with sufficient frequency in the conversations.

During the simulation, each virtual agent action is generated using the deep Q learning process described above. The virtual agent's action is then used to determine a "simulated user" action according to a look-up table (e.g., look-up table 812). Where the table provides more than one possible user action for a given virtual agent action, a single action is selected using probabilistic sampling. The sampling probability distribution may be arranged so that the actions that a human user is expected to take under normal circumstances are assigned relatively higher probability values. After generating a simulated user response, the system may then generate another virtual agent action according to the deep Q learning process.

Because the user actions in the look-up table may be stored in a codified manner, the process of simulating a user response may further include mapping the codified action to a natural language (NL) utterance in a textual form. In some cases, the conversion from the codified user action to the NL utterance may be implemented via a table look-up mechanism. Alternatively, NL utterances could be generated using more sophisticated techniques, such as Sequence Generative Adversarial Networks (seqGAN), which is based on sequence-to-sequence deep learning models. In cases where the virtual agent corresponds with an end user through speech (as opposed to text), user simulator 800 may further process the user response with a text-to-speech converter (e.g., text-to-speech synthesis unit 118) and then a text-to-speech (TTS) converter (e.g., speech recognition system 110) to introduce and process noise artifacts that would be present during testing/deployment.

The process of simulating user responses to the virtual agent's actions (using a look-up table plus further processing) and generating a new virtual agent action with the DQN may proceed until certain conditions are met and the dialogue is completed. For example, if the number of the utterances from the virtual agent and/or the user reaches a threshold, the dialogue may be completed. A dialogue may also be completed once the user goal is reached. After the termination of a given dialogue, another dialogue is simulated, unless the corresponding termination criteria are met.

It may be appreciated that the dialogues generated by user simulator 800 may vary significantly even when the input domain information and look-up tables are similar. This occurs because the table includes multiple user actions in some cases and multiple mappings of a given codified user action to a natural language utterance.

It should also be appreciated that the user simulator generates training dialogues that capture how the user may react to the virtual agent's actions. In contrast, the goal of the dialogue management system is to determine which actions to take in response to user actions. This is achieved by training the virtual agent on the dialogue training data generated by the user simulator.

Reinforcement learning techniques for training a dialogue management system may not perform well if the rewards are sparse. As one example, a training session in which the user's feedback is available only at the end of a dialogue session would provide insufficient reward signals for training. Likewise, the reward signals may not be sufficient if the feedback given is a binary choice between "satisfactory" or "unsatisfactory." By using sparse rewards, the agent cannot be sure which actions led to the overall successful or unsuccessful result.

The present embodiments use a reward generator to provide reward signals at each time step in the training process. These reward signals may be calculated, or otherwise determined, from either explicit or implicit information present in user responses, the broader dialogue context, and/or other user/environment information available at a given point in time.

Figure 9:
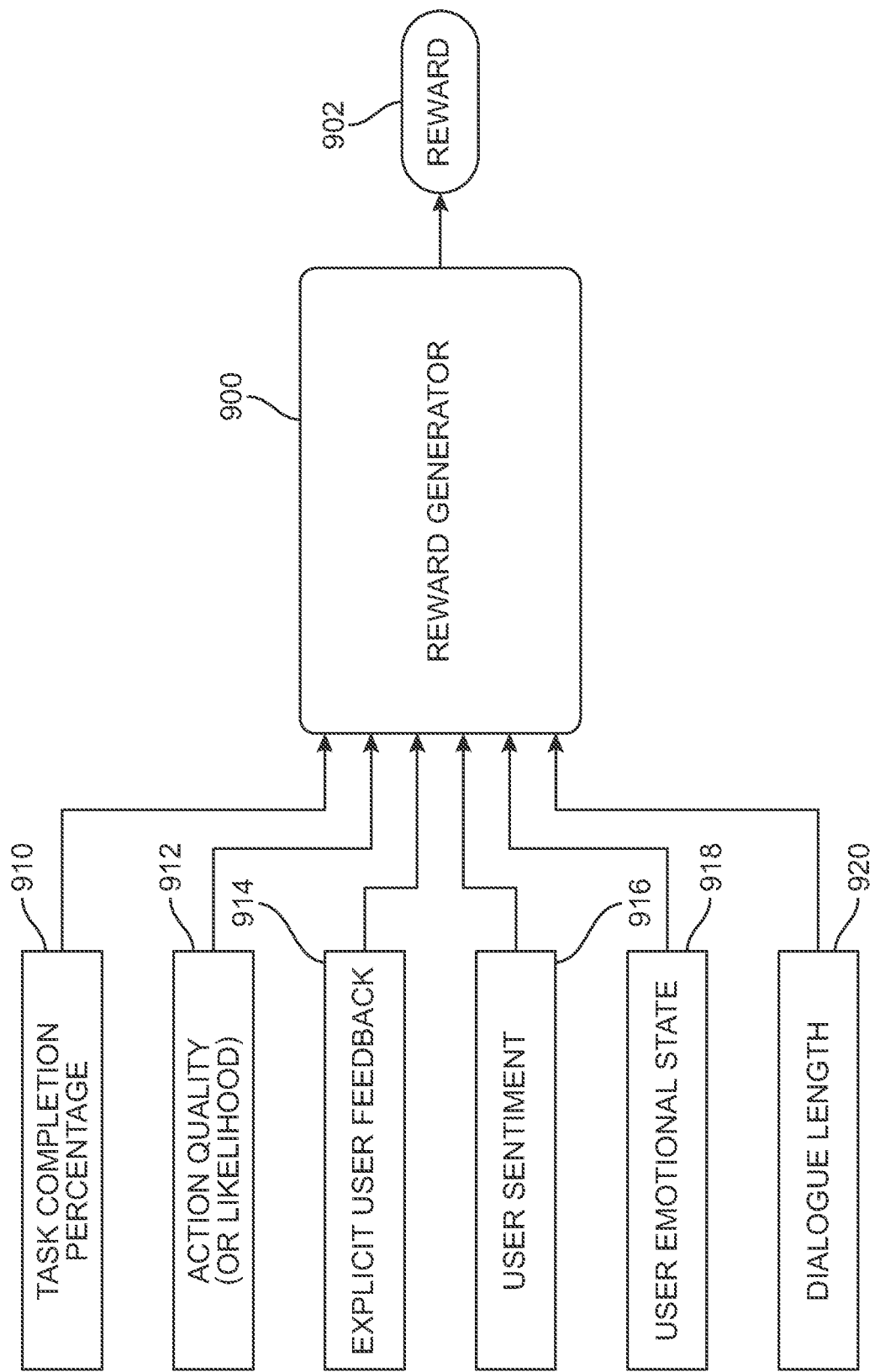
FIG. 9 is a schematic diagram of an embodiment of a reward generator including a set of inputs.

A reward generator may include one or more inputs that are used to determine an output: the value of the reward at a given time step. For example, FIG. 9 is a schematic view of a reward generator 900 that makes use of multiple inputs to generate a reward 902. These inputs include a task completion percentage 910, an action quality 912, an explicit user feedback 914, a user sentiment 916, a user emotional state 918, and a dialogue length 920.

Reward generator 900 may comprise a system for receiving and combining information related to these inputs to produce a single numerical output representing the reward at the current time step. In other words, the final reward is calculated by summing multiple "reward components," where each reward component corresponds to one of the inputs.

In some embodiments, reward generator 900 comprises a function that combines the values of the inputs. In some cases, the values of the inputs could be scaled. As an example, in one embodiment, multiple inputs could be scaled to have a value between 0 and 1 before being combined with one another. In some cases, the inputs could be combined using a simple or weighted sum. Using a weighted sum allows the inputs to be weighted according to their importance and/or according to their reliability.

Figure 10:
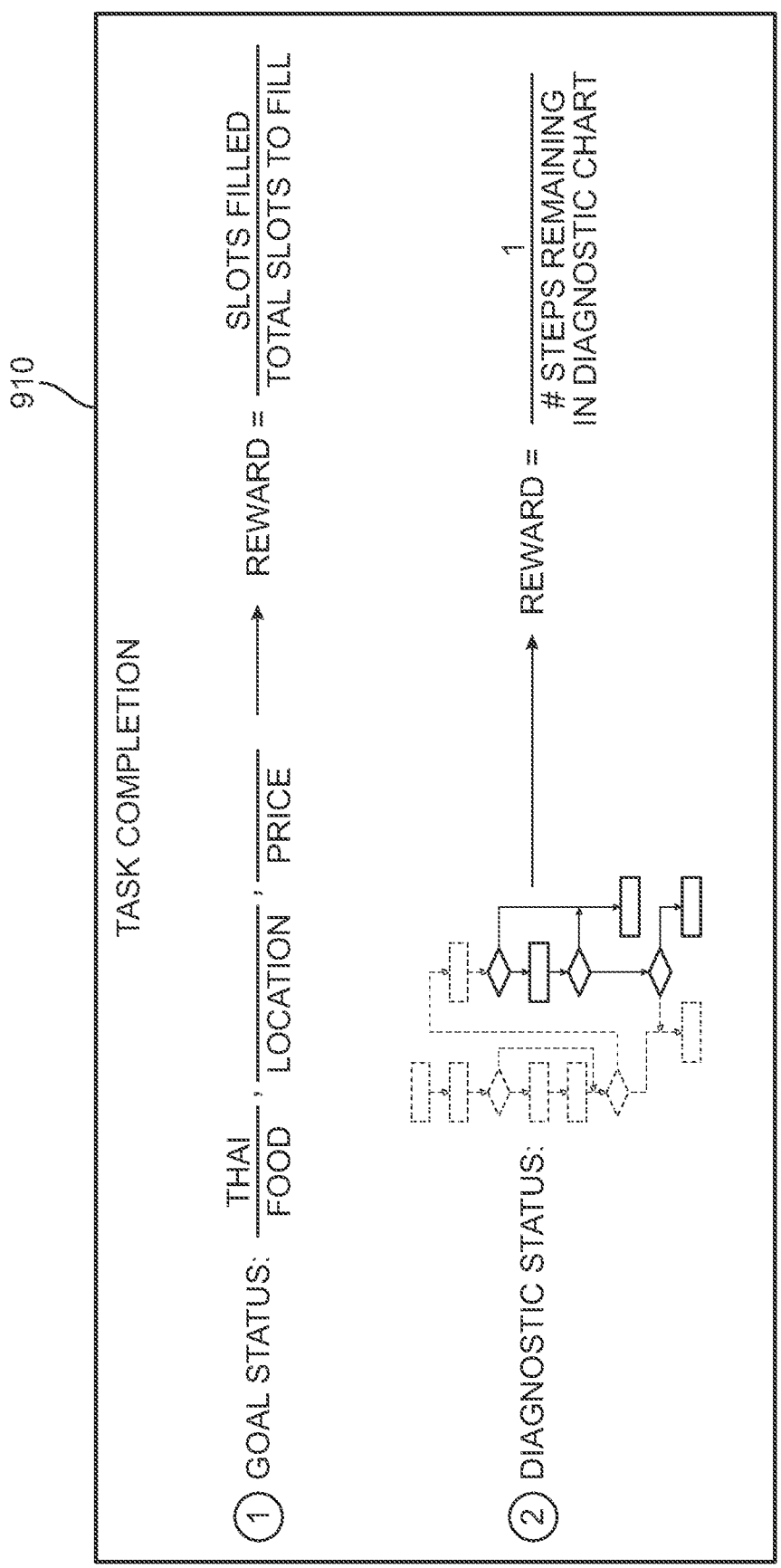
FIG. 10 is a schematic diagram of an embodiment of two methods for determining a task completion reward component.

FIGS. 10-11 illustrate schematic views of possible implementations of some of the reward components associated with the inputs depicted in FIG. 9. For example, FIG. 10 illustrates a schematic view of two possible ways of implementing the reward component corresponding with task completion percentage 910. In both examples depicted in FIG. 10, the value of the reward component increases as the completion percentage increases. In the first example depicted in FIG. 10, a virtual agent tracks a goal status. In this case, the goal status includes a set of slots to be filled as well as the values for any slots that have been filled to this point in the conversation. That is, the virtual agent has determined that the user wants to find a particular kind of food at a particular location and price (the slots) and is conversing with the user to determine the particular type of food, location, and price (the slots values). Thus, the present task is completed once the virtual agent has identified and confirmed user desired values for these slots (at which point the virtual agent can use a Q&A engine to look up restaurants for the user). The reward component is calculated as a ratio of the number of slots filled to the total number of slots to fill. In the first example of FIG. 10, this would correspond to a value of ⅓ since there are three slots to be filled but only the first (food) has been filled with a user desired value.

In a second example depicted in FIG. 10, a virtual agent keeps track of the number of remaining steps left in a diagnostic flow-chart. That is, at each time step, the virtual agent considers how many more steps must be traversed in a diagnostic flow-chart before an end state is reached. The closer the agent gets to the end state, the greater the reward. The reward component is calculated as the inverse of the number of steps remaining in the diagnostics flow-chart. Alternatively, other metrics for "distance to end of the flowchart" could be used to calculate the reward component.

It may be appreciated that because the reward component increases as the task completion percentage increases, this type of reward encourages task completion as the agent learns to select actions that will achieve task completion sooner.

FIG. 11 is a schematic view of an embodiment depicting several different ways of calculating reward components from explicit or implicit user feedback and/or other observed user behavior. In this example, a user 1100 is engaged in a chat with a virtual agent that may occur through the internet. This chat could be text based, voice based, video based, and/or some combination of these. For simplicity, it is assumed that both text-based interactions and video-based interactions are used in this example.

As seen in FIG. 11, user 1100 has entered text into a chat window with the virtual agent. This text includes explicit feedback in the form of two "thumbs-up" emojis 1102. Such explicit feedback may be characterized as a "user feedback token." The term "user feedback token" refers to various kinds objects or symbols that might have an explicit meaning in normal use and which do not require semantic interpretation. Examples of user feedback tokens include, but are not limited to, emojis, GIFs, and special characters or character combinations (such as "!", "?", and "!?"). In one embodiment, a reward component corresponding to explicit user feedback can be calculated as a difference between the number of positive emojis and the number of negative emojis (possibly normalized so the reward component takes on a value between 0 and 1).

In addition, the text entered by the user states that "this is helpful." The virtual agent can analyze this input using sentiment analysis 1110, which can be used to classify a statement as expressing positive or negative sentiments. Thus, in some cases, a reward component corresponding to user sentiment 916 could be determined using the score from a sentiment analysis applied to the latest user response (or history of responses). Systems and processes for sentiment analysis of strings or sequences of words (e.g., of tweets) are known in the machine learning art.

In some embodiments, the body language of a user could be analyzed. As seen in FIG. 11, a camera may be used to capture images of user 1100. These images, which may be stored as part of the "state" of the system during training, can be used to detect a user's emotional state at some time step in the dialogue. For example, body language analysis 1112 could be applied to images of the face of user 1100. The output of this analysis may be a score of the user's emotional state that can be used as a reward component. In some cases, body language analysis may comprise classifying a user's facial expression as "happy" or "sad." Such classification could be accomplished using a conventional convolutional neural network (CNN).

Using one or more of the exemplary methods depicted in FIG. 11 to determine rewards from explicit and/or implicit user feedback to a virtual agent during a dialogue session may help encourage the agent to take actions that receive more positive feedback from the user.

Often a user would prefer to have the shortest possible conversation with a virtual agent to achieve their end goal (e.g., booking a flight, solving a diagnostic issue, etc.). The input corresponding to dialogue length 920 may be used to discourage longer dialogues. This may be achieved, in one embodiment, by using a negative reward component for dialogue length, where the magnitude of the negative reward component increases with the dialogue length. For example, the dialogue length reward component could be calculated as $R=-0.1*t$, where t is the current time step. In another example, the magnitude of the dialogue length reward component could be constant for the first T time steps, and could be increased with each step beyond T. Such a reward component would discourage dialogues from extending beyond a certain length, rather than creating a preference for the shortest dialogues possible.

The input for action quality 912 may be used to encourage an agent to take more probable actions (i.e., actions that may be taken more often by real users). In some cases, the reward component corresponding to action quality 912 may be greater for actions that are more likely. In some embodiments, an action quality input may be provided by another system or module, such as an action screener. As described in further detail below, in some embodiments, an action screener can assign a probability to each possible action that a virtual agent might take. In these embodiments, action quality 912 could be the probability associated with the virtual agent's current action.

While the embodiment of FIG. 9 depicts six distinct inputs to a reward generator, some of these inputs could be optional in some embodiments. Moreover, in some cases, not all inputs that are made available to a reward generator are utilized at each time step. In other words, in some cases, the choice of which inputs to use could depend on the state of the system. For example, in an embodiment equipped to receive body language information and process this into a user emotional state input, there may be times in the conversation where the body language can be accurately classified and other times when it may not be accurately classified. The reward generator may decide to use the user emotional state input only when the body language can be classified in an accurate manner.

In other embodiments, still additional inputs could be used to determine corresponding reward components and facilitate the calculation of an overall reward at each time step.

Using multiple reward components to determine an overall reward for a virtual agent may help the agent learn to balance competing goals. For example, using only dialogue length to determine an overall reward may prevent the agent from learning approaches that are more satisfactory to a user even if they take a bit more time (i.e., a greater number of interactions) compared with approaches that primarily focus on reducing dialogue length while completing a task. By incorporating a range of metrics that balance short-term and long-term satisfaction of a user, the agent may learn more accurate and robust strategies and may provide responses that are more conversational in manner compared to approaches that focus on narrowly defined metrics (i.e., only immediate user satisfaction or only overall/end user satisfaction).

As described above, some embodiments can incorporate an action screener to help manage the universe of actions that a virtual agent may consider during training and/or testing/deployment. There are at least two reasons for incorporating an action screener into a dialogue management system. First, deep reinforcement learning (DRL) is computationally intensive and can take a long time to achieve desired behavior. Second, the DRL system may converge to a poor solution in the absence of any guidance a priori regarding which actions are most suitable in a given context. Using an action screener may help with at least these two issues. Specifically, by screening or filtering out actions that are less relevant at a given moment in the dialogue, the action screener reduces the set of actions that need to be considered. This reduces the computational intensity (and computation time) of the forward and backward passes through the DNN, as only nodes corresponding to the set of screened actions need to be calculated/updated. This reduction in the number of calculations to be performed at each time step may greatly improve the speed of training and also of the response time of the system during testing/deployment. Moreover, by removing potentially irrelevant and erroneous actions that otherwise might have been considered by the DNN, the action screener helps reduce the chances of the DNN converging to a poor solution. This improves the quality of the virtual agent actions and its response to the user.

To understand the utility of the action screener, consider an ongoing dialogue between a virtual agent and a user in the task-oriented setting. The dialogue usually starts with greetings such as "Hello", etc. Assume now that the dialogue has proceeded beyond the preliminary greeting stage and the two parties are in the "middle" of the conversation. Suppose, at this stage, the user asks a question related to some aspect of the task to the virtual agent. Then, it is unlikely that the virtual agent would respond to the user with a greeting such "Hello" or "Good Morning", etc. Since these actions may be irrelevant to the current context, the actions would have a low value attached to them, and thus, need not be processed by the DNN.

Figure 12:
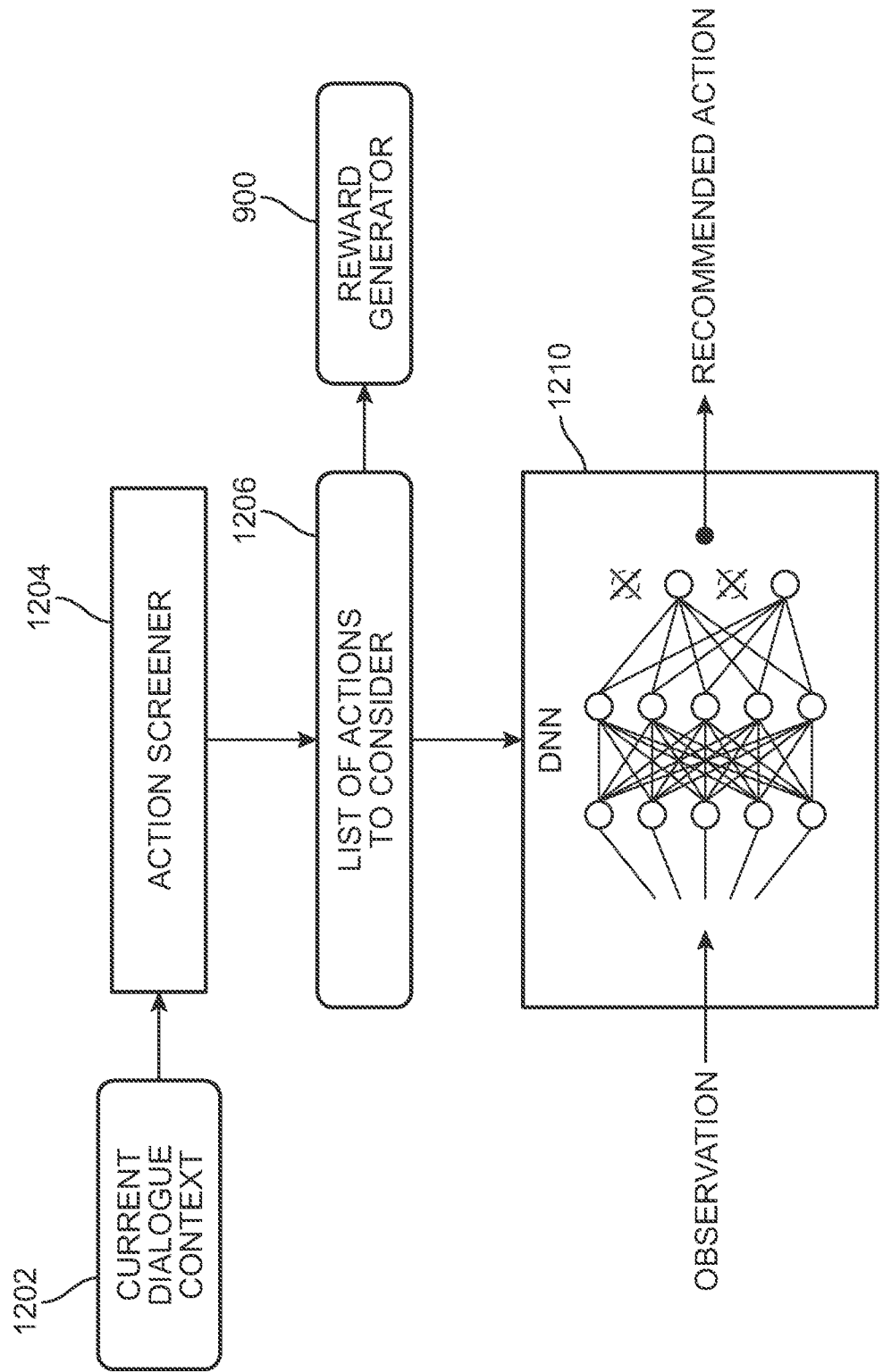
FIG. 12 is a schematic view of an embodiment of some components of a dialogue management system including an action screener.

An exemplary process for a virtual agent that incorporates an action screener is depicted in FIG. 12. This process may be used during training as well as in testing and/or deployment (possibly with some modifications). Referring to FIG. 12, an action screener 1204 comprises a system that processes inputs and outputs information related to actions that a DQN system should consider at the current time step. In the example of FIG. 12, the input comprises the current dialogue context 1202. This may include not only the most recent user response but the full dialogue history. In some cases, additional information regarding the current state of the user/environment and/or other meta-parameters of the DQN system could be used as inputs to action screener 1204. In this example, the output is provided as a list of actions to consider 1206. It may be appreciated that this list of actions may typically be a subset of the set of all possible actions an agent can take. More specifically, the universe of "all possible actions" may refer to the set of N actions associated with the N output nodes of the DNN, where the value of N depends on the specific DNN architecture. Thus, the subset of actions selected by the action screener may typically be smaller than N.

In FIG. 12, the agent's DQN system 1210 is shown schematically. In this case, list of actions to consider 1206 are used to inform DQN system 1210 about the subset of actions that should be considered during a forward or backward pass through the DNN of the DQN system. Based on this information, DQN system 1210 can reduce the number of calculations necessary to compute output values by ignoring calculations associated with the subset of actions not being considered by the DQN system.

In some cases, the output of action screener 1204 may include not just a list of actions to consider, but a probability associated with these actions. In other cases, the output of action screener 1204 may not provide probabilities but may supply a ranking of the actions to be considered. This additional information (probabilities and/or ranking) can be passed with the list of actions to reward generator 900 so that a reward component corresponding with the quality of the action can be calculated. For example, the greater the probability (or ranking) an action has (as assigned by the action screener), the greater the corresponding reward component may be.

Figure 13:
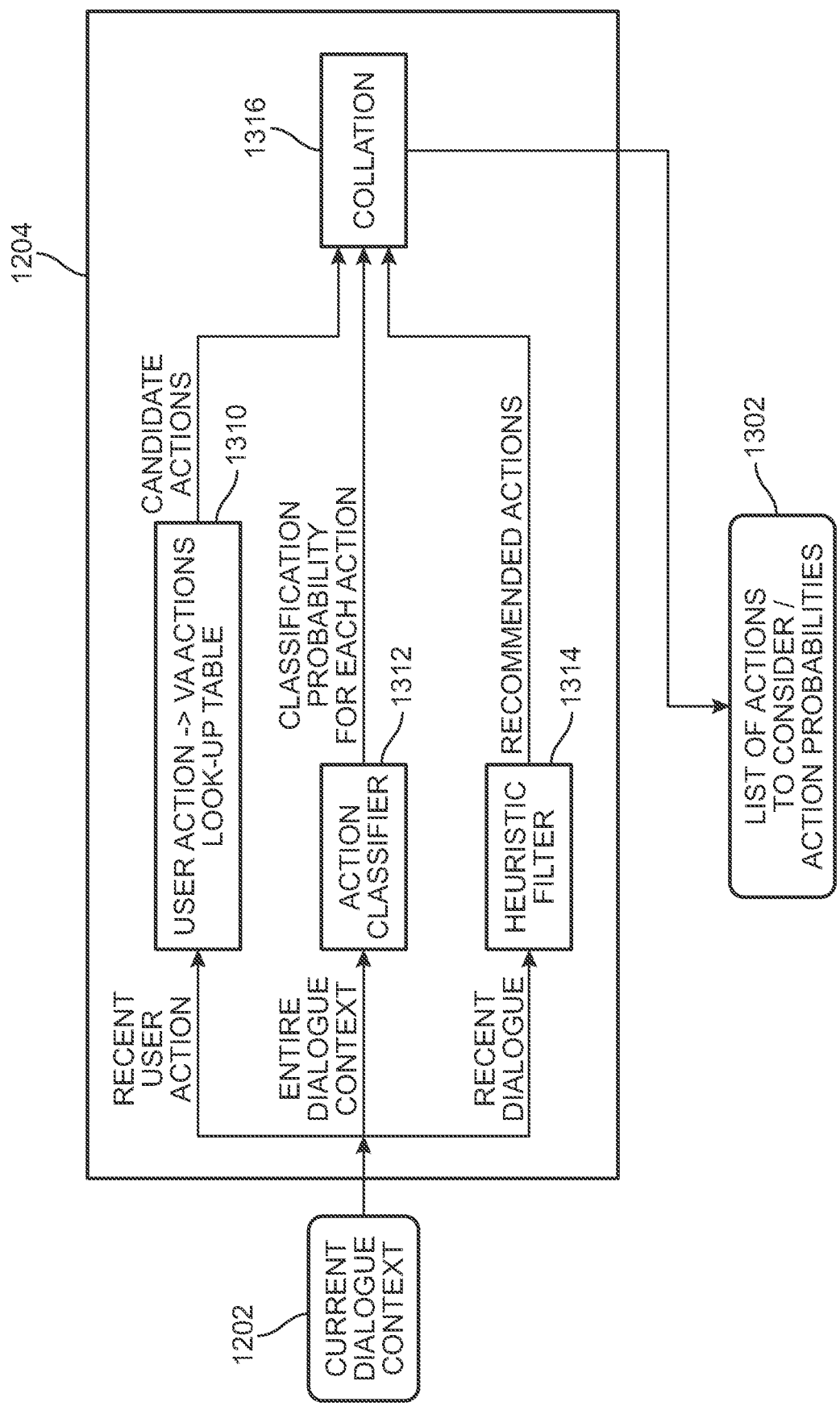
FIG. 13 is a schematic view of an embodiment of an action screener.

FIG. 13 is a schematic view of an embodiment of action screener 1204, which comprises three separate screening modules for processing input. These modules include a mapping-based module 1310 (e.g., a look-up table), an action classification module 1312, and a heuristic module 1314. Each module may act on some input, which could be a subset of the input to the action screener itself, and output a list of recommended actions and/or associated metrics (such as probabilities, rankings, etc.) for the actions. The outputs from each module are fed to a collation module 1316 that organizes the information. For example, collation module 1316 may combine the recommended actions from each module into a master list and remove any duplicates in the process. This final list in the form of a list of actions to consider (along with possibly probabilities/rankings) are provided as output 1302 of action screener 1204. As discussed in reference to FIG. 12, output 1302 may then be fed to the DNN of the DQN system and/or to the reward generator.

As seen in FIG. 13, action screener 1204 includes mapping-based module 1310 that receives the user action as an input and outputs a list of candidate actions. In some cases, mapping-based module 1310 may take the form of a look-up table that maps each user action to a set of candidate virtual agent actions. In some cases, this look-up table may be similar to look-up table 812 used by user simulator 800 (see FIG. 8). A look-up table approach may be suitable when the number of possible user-action/virtual agent action(s) is relatively small. Here, it may be appreciated that the look-up table may employ a distinct entry for each possible natural language utterance of each user action, since in real-world situations distinct utterances may correspond with the same intended user action (greeting, request info, etc.). Therefore, in embodiments where the number of possible utterances becomes too large to manage with a look-up table (such as for a large vocabulary task or a complex task), an associative-memory-like structure may be employed to capture and store the association or mapping between the user and virtual agent actions.

Action screener 1204 also includes action classification module 1312 that receives an input and outputs a classification probability for each action in the input. In some cases, the input could be a recent user action. In the exemplary embodiment shown in FIG. 13, the input corresponds to the entire dialogue context. Action classification module 1312 employs one or more classification methods. Examples include a Softmax classifier and a Naive Bayes Classifier, both of which are known machine-learning methods for classifying a set of inputs into M distinct classes. Here, M is a number corresponding to the total number of actions that would otherwise be considered by the virtual agent (before screening).

In one embodiment, the current dialogue context is input as a feature vector into a classifier that outputs a vector of scores having length M. Each score may correspond to the probability that a given action is appropriate given the dialogue context. To screen the actions (i.e., eliminate some of them and recommend others), an "action screening threshold" can be defined. If an action has a score (output by the classifier) that is greater than the action screening threshold, it may be recommended. Otherwise, the action may not be recommended. The output to the action classification module 1312 may therefore be a classification probability for each action, and/or a list of recommended actions that have been filtered according to the action screening threshold. In some other embodiments, action classification module 1312 could comprise a Long Short-Term Memory network (LTSM) with a Softmax classifier.

Action screener 1204 also includes heuristic module 1314. Heuristic module 1314 may use a heuristic or rule-based approach to select candidate actions. Generally, heuristic module 1314 may include rules that guide or focus the agent on solving a particular subtask, before moving on to explore other actions. For example, in a slot-filling scenario where a virtual agent is attempting to meet the user's goal by identifying the user's preferences for particular slots (e.g., "Indian" for the food slot, "cheap" for the price slot, etc.), heuristic module 1314 may include rules that select actions that are most likely to lead to fulfilling the current subtask. Specifically, if a scan of the slots reveals that a certain slot value (e.g., the price slot) is needed from the user, then the virtual agent needs to consider only those actions that correspond to the solicitation of the slot value. In other words, the virtual agent can ignore any actions that would not help it in determining the slot value. Similarly, if the user has provided a slot value for a given slot, but it has not yet been confirmed—then, only the verification-related actions need to be considered (e.g., the virtual agent need only consider tasks along the lines of asking "Did you say you wanted cheap food?").

In some situations, it may not be desirable to repeatedly query the user to ask for and check the slot values, especially when the number of slots is not small. Similarly, the user may not actually have a constraint for a slot value. In such cases, the above logic is refined to incorporate "Any" as a wildcard value for the slots and the heuristics are modified accordingly.

In some situations, the screening effect of the above methods may be limited (say, due to the nature of the domain or the lack of sufficient information about the use cases and domain, etc.) or substantial computing resources may be available. In such cases, the screening of the virtual agent actions may be tapered and eventually turned off after an initial burn-in period.

As discussed above, using an action screener can provide benefits in two different ways: first by limiting the number of actions that need to be considered during training and/or testing/deployment; and second by providing a metric for calculating a reward component corresponding to the "quality" of a given action.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of training a dialogue management system to converse with an end user, the method using a deep Q-learning system comprising a first deep neural network having a first set of training parameters and a second deep neural network having a second set of training parameters, the deep Q-learning system being used to predict actions for the dialogue management system from a set of available actions, the method comprising:
retrieving training dialogue data;
generating a first observation from the training dialogue data;
using the first deep neural network to predict a first set of Q-values from the first observation;
selecting a first recommended action for the dialogue management system according to the first set of Q-values;
using the first recommended action to generate a second observation from the training dialogue data;
generating a reward using the second observation;
using the second deep neural network to predict a second set of Q-values from the second observation;
updating the first set of training parameters for the first deep neural network using the reward and the second set of Q-values associated with the second observation;
using the first deep neural network, with the updated first set of training parameters, to predict a third set of Q-values from the second observation; and
selecting a second recommended action for the dialogue management system according to the third set of Q-values.

2. The method according to claim 1, wherein the method includes identifying a current task, calculating a completion percentage of the current task, and wherein the reward is calculated as a function of the completion percentage of the current task.

3. The method according to claim 1, wherein the method includes identifying one or more user feedback tokens in the first observation and wherein the reward is calculated as a function of the number of user feedback tokens.

4. The method according to claim 1, wherein the method includes performing a sentiment analysis on information derived from the first observation and wherein the reward is calculated as a function of the output of the sentiment analysis.

5. The method according to claim 1, wherein the method includes receiving image information corresponding to a real or simulated user, analyzing the image information to determine an emotional state of the real or simulate user, and wherein the reward is calculated as a function of the emotional state.

6. The method according to claim 1, wherein the method includes using an action screener to constrain the number of predicted outputs that need to be calculated by the first deep neural network.

7. The method according to claim 6, wherein the step of using the action screener further includes:
feeding information related to the first observation into a classification module and outputting a classification score for each action in a set of actions;
retrieving a classification threshold;
generating a subset of actions from the set of actions, wherein the subset of actions includes actions for which the classification score is greater than the classification threshold; and
constraining the number of predicted outputs that need to be calculated by the first deep neural network according to the subset of actions.

8. The method according to claim 7, wherein the classification scores output by the classification module are used to calculate the reward.

9. The method according to claim 1, wherein the method further includes updating the second set of training parameters of the second deep neural network, and wherein the second set of training parameters are updated less frequently than the first set of training parameters for the first deep neural network.

10. The method according to claim 9, wherein updating the second set of training parameters comprises setting the second set of training parameters equal to the first set of training parameters of the first deep neural network.

11. A non-transitory computer-readable medium storing software comprising instructions executable by one or more computers which, upon such execution, cause the one or more computers to:
retrieve training dialogue data;
generate a first observation from the training dialogue data;
use a first deep neural network to predict a first set of Q-values from the first observation, the first deep neural network having a first set of training parameters, the first deep neural network comprising part of a deep Q-learning system, and the deep Q-learning system further comprising a second deep neural network having a second set of training parameters;
select a first recommended action for a dialogue management system according to the first set of Q-values;
use the first recommended action to generate a second observation from the training dialogue data;
generate a reward using the second observation;
use the second deep neural network to predict a second set of Q-values from the second observation;
update the first set of training parameters for the first deep neural network using the reward and the second set of Q-values associated with the second observation;
use the first deep neural network, with the updated first set of training parameters, to predict a third set of Q-values from the second observation; and
select a second recommended action for the dialogue management system according to the third set of Q-values.

12. The non-transitory computer-readable medium storing software of claim 11, wherein the instructions executable by one or more computers, upon such execution, cause the one or more computers to identify a current task, calculate a completion percentage of the current task and calculate the reward using the completion percentage of the current task.

13. The non-transitory computer-readable medium storing software of claim 11, wherein the instructions executable by one or more computers, upon such execution, cause the one or more computers to identify one or more user feedback tokens in the first observation and calculate the reward using the number of user feedback tokens.

14. The non-transitory computer-readable medium storing software of claim 11, wherein the instructions executable by one or more computers, upon such execution, cause the one or more computers to perform a sentiment analysis on information derived from the first observation and calculate the reward using the output of the sentiment analysis.

15. The non-transitory computer-readable medium storing software of claim 11, wherein the instructions executable by one or more computers, upon such execution, cause the one or more computers to use an action screener to constrain the number of predicted outputs that need to be calculated by the first deep neural network.

16. A dialogue management system and a reinforcement learning system for training the dialogue management system to converse with an end user, comprising:
one or more computers and one or more storage devices storing instructions that are operable, when executed by the one or more computers, to cause the one or more computers to:
retrieve training dialogue data;
generate a first observation from the training dialogue data;
use a first deep neural network to predict a first set of Q-values from the first observation, the first deep neural network having a first set of training parameters, the first deep neural network comprising part of a deep Q-learning system, and the deep Q-learning system further comprising a second deep neural network having a second set of training parameters;
select a first recommended action for a dialogue management system according to the first set of Q-values;
use the first recommended action to generate a second observation from the training dialogue data;
generate a reward using the second observation;
use the second deep neural network to predict a second set of Q-values from the second observation;
update the first set of training parameters for the first deep neural network using the reward and the second set of Q-values associated with the second observation;
use the first deep neural network, with the updated first set of training parameters, to predict a third set of Q-values from the second observation; and
select a second recommended action for the dialogue management system according to the third set of Q-values.

17. The dialogue management system and reinforcement learning system according to claim 16, wherein the instructions are operable, when executed by the one or more computers, to cause the one or more computers to generate the reward using a sentiment analysis performed on the first observation.

18. The dialogue management system and reinforcement learning system according to claim 16, wherein the instructions are operable, when executed by the one or more computers, to cause the one or more computers to generate the reward using the number of user feedback tokens identified in the first observation.

19. The dialogue management system and reinforcement learning system according to claim 16, wherein the instructions are operable, when executed by the one or more computers, to cause the one or more computers to use an action screener to output a classification score for each action in a set of actions.

20. The dialogue management system and reinforcement learning system according to claim 16, wherein the instructions are operable, when executed by the one or more computers, to cause the one or more computers to use a classification score when generating the reward.

* * * * *